June 26, 1928.

J. R. KELLER

1,675,273

FEEDING MOLTEN GLASS

Filed May 26, 1924   5 Sheets-Sheet 1

INVENTOR
John R. Keller

June 26, 1928. 1,675,273
J. R. KELLER
FEEDING MOLTEN GLASS
Filed May 26, 1924 5 Sheets-Sheet 3

INVENTOR
John R. Keller

June 26, 1928.

J. R. KELLER 1,675,273

FEEDING MOLTEN GLASS

Filed May 26, 1924

INVENTOR
John R. Keller

Patented June 26, 1928.

1,675,273

UNITED STATES PATENT OFFICE.

JOHN R. KELLER, OF GLENSHAW, PENNSYLVANIA, ASSIGNOR TO HARTFORD-EMPIRE COMPANY, OF HARTFORD, CONNECTICUT, A CORPORATION OF DELAWARE.

FEEDING MOLTEN GLASS.

Application filed May 26, 1924. Serial No. 715,851.

My invention relates to the art of feeding molten glass from a container in a succession of mold charges of proper weight, shape and condition to be fabricated into ware.

One object of my invention is to provide a simple and effective method and apparatus for feeding molten glass whereby the glass shall be delivered from a tank or other container in a continuously flowing stream and shall be received in a receptacle provided with means for periodically expelling the glass in discontinuous mold charges of controllable size and shape.

Another object of my invention is to provide a glass feeding system, of the character indicated above, wherein the glass shall be effectively mixed during its delivery from the container, thereby causing the mold charges to be uniform in temperature and consistency.

A further and more specific object of my invention is to provide a glass feeding system including a receptacle for receiving a continuously flowing stream of molten glass, the receptacle being provided with an impeller and with a discharge outlet, and the expulsion of the glass from the receptacle being accomplished by relative horizontal movement of the impeller with respect to the container. The glass is confined during the generation of the expelling pressure, and the force and duration of the pressure are regulated to any desired extent for the production of mold charges of the desired size and shape. In one embodiment of my invention the impeller is stationary and the receptacle swings in a horizontal arc to alternately generate pressure for expelling the glass, and to relieve such pressure for the purpose of interrupting the discharge of glass from the receptacle. In another embodiment of my invention the receptacle is held stationary and the impeller is caused to swing in a horizontal arc for the same purposes.

The art of feeding molten glass from tank furnaces or other containers has developed along two distinct lines. According to one of these, the glass is caused to issue from the furnace in a continuous stream that is received in some sort of cup or other husbanding device which accumulates a mass of the glass and discharges it into a mold and accumulates a further mass while the mold is being removed and replaced by an empty mold. This system, which is commonly termed the "stream feeding" system, has the advantage of simplicity, since it is not necessary to provide any moving parts within the receptacle, but it has the disadvantage that the glass is received in the accumulating cup, as heretofore employed, in a stream which coils and laps upon itself, and this coiling and lapping action produces a non-uniform mass which results in imperfections in the finished ware.

The second general system now in use for feeding glass from tank furnaces is known as "gob feeding" or "suspended charge feeding". The characteristic features of this system are that the glass is delivered from an outlet in a mass which is accumulated and shaped while in freely-hanging suspension, and is then cut off and falls as a unit into the mold. This system has the advantage that the mold charge is produced and shaped in a single mass, which is completed before it comes in contact with the mold or with any other chilling surface, and at the same time, the chilled skin or enamel which forms on the surface of the glass as soon as it is exposed to the air is not disrupted or infolded at any time during the production of the mold charge. For these reasons the suspended-charge system of feeding is now recognized as being superior to the stream-feeding system.

My present invention aims to combine the simplicity of the stream-feeding system with the advantages of the suspended charge feeding system. I carry out this invention by causing the glass to flow in a continuous stream through a downwardly opening outlet, or over a discharge lip, the stream being received in a receptacle which has a downwardly opening discharge outlet displaced laterally from the outlet through which the glass is delivered from the furnace. While the glass is in the receptacle it is subjected to a squeezing or pinching action produced by relative horizontal movement of the receptacle and an impeller contained therein, and this squeezing action forces the glass through the discharge outlet of the receptacle in a mass having a size and shape that depend upon the degree of pressure set up within the receptacle and the time during which such pressure is applied. These factors are readily adjustable to produce various sizes and shapes of mold charges. After each mold charge is delivered, a retractive impulse is applied to the glass at the discharge outlet of the receptacle, by relative horizontal movement of the impeller, and the receptacle, and this retractive impulse is sufficient to check or reverse the movement of the glass through the feeding outlet. The relative movements of the impeller and the receptacle also serve to agitate the glass in the receptacle and mix it thoroughly.

For a further understanding of my invention reference may now be had to the accompanying drawings, in which:—

In Figs. 1 to 6 of the drawings, the numeral 2 indicates a portion of a container for molten glass which may be a forehearth connected to a tank furnace, or may be any other container suitable for holding a considerable quantity of molten glass. The container 2 is provided with an outlet block 3 in which is formed a downwardly opening discharge outlet 4 through which the glass issues in a vertical column 5.

Supported below the outlet 4 is a receptacle 6 which is composed of refractory material, and may be held in a metal casing 7. The receptacle 6 is provided with a discharge outlet 8, which, as shown, is of downwardly tapering shape and communicates with an opening in a projection 9 which is formed as an extension of the receptacle 6. Surrounding the projection 9 and secured to the bottom of the metal casing 7 of the receptacle, is a plate 10 having a depending annular flange 11 that fits around a stationary annular support 12 which supports the weight of the receptacle 6 and its attachments, and is mounted upon suitable supports, not shown. A gasket of anti-friction material may be placed between the plate 10 and the support 12, as shown at 13. The receptacle 6 may have the generally triangular shape shown in Figs. 2 and 5, the discharge outlet 8 being located near one angle of the receptacle.

For the purpose of oscillating the receptacle 6 around the axis of its discharge outlet 8, I provide a lever 14 that is secured to the metal casing of the receptacle and is shown as a continuation of the plate 10. The lever 14 is supported at its free end on a roller 15 secured to bracket 15$^a$ and engaging with a circularly curved track 16 having the center of the outlet orifice 8 as its center of curvature. The lever 14 is pivotally connected at its outer end to a link 17, which is connected to suitable means, not shown, for swinging the lever 14 between the position shown in full lines in Fig. 2 and the position shown in dotted lines in this figure. This swinging movement of the lever 14 acts to swing the receptacle 6 between the full-line position and the dotted-line position shown in Fig. 2.

Supported within the receptacle 6 is a stationary impeller 20, which may be suspended in any suitable manner from the container 2, or from any other convenient stationary support. As shown, the impeller 20 is secured to the under side of a channel 21, which forms part of the iron frame-work for supporting the container 2. A suitable dovetail member 20$^a$ is secured to the channel 21 and fits into a dove-tail slot formed in the refractory impeller 20.

The impeller 20 has at one end an extension 22 in which is formed an opening 23 to receive the descending column of glass 5. The impeller also has a depending wall portion 24 and an overhanging portion 25, and the portions 24 and 25 are preferably arranged at about the angle with respect to each other shown in Fig. 3, so as to form a pocket for confining the glass in the manner which will be described below. At the end of the impeller 20 opposite to the opening 23, the depending wall portion 24 is curved so as to partially surround the discharge outlet 8, as shown at 26, Fig. 5. The opposite end of the wall portion 24 is similarly curved, as shown at 27, Fig. 5, so as to partially surround the opening 23.

Figure 1:
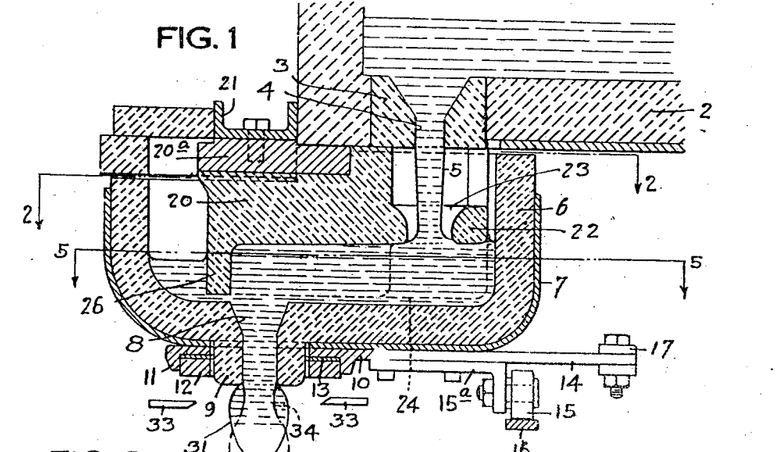
Figure 1 is a vertical sectional view taken through the discharge outlets of a glass feeding apparatus constructed in accordance with my invention, the section being taken substantially on the line 1—1 of Fig. 2.
Figures 2, 3, 6:
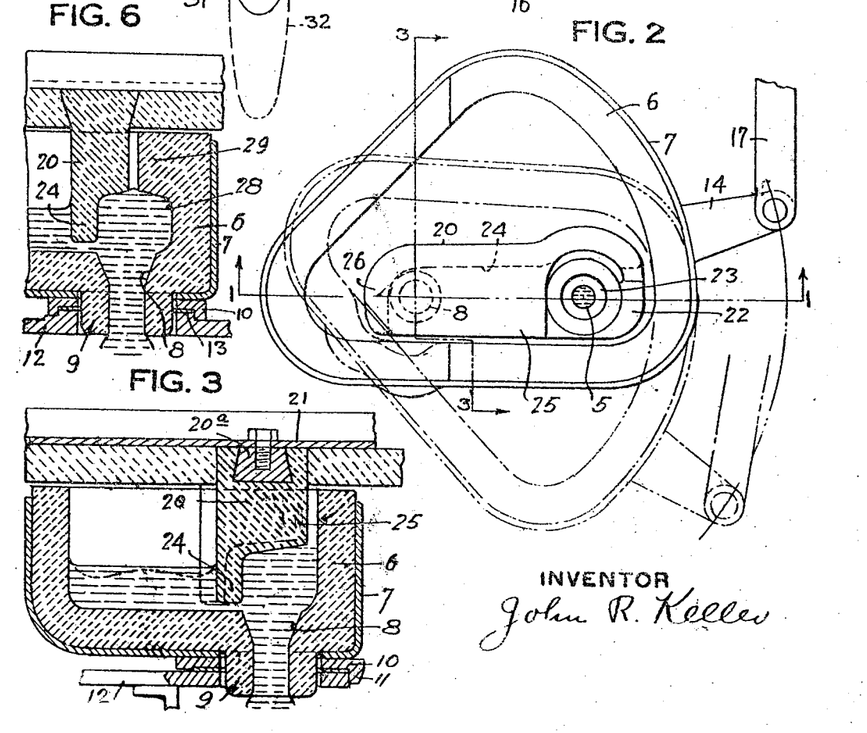
Fig. 2 is a plan view of the receptacle and the impeller, the structure above the line 2—2, Fig. 1, being omitted.
Fig. 3 is a transverse vertical sectional view taken substantially on the line 3—3 of Fig. 2.
Fig. 6 is a transverse sectional view similar to a portion of Fig. 3, showing a slightly modified construction.

Fig. 6 shows a modified construction in which the wall of the receptacle 6 opposite to the impeller 20 is formed with a recess 28, and with an overhanging portion 29, these parts cooperating with the impeller 20 to form a pocket for receiving and confining the glass during the discharge periods.

Figures 4, 5, 7:
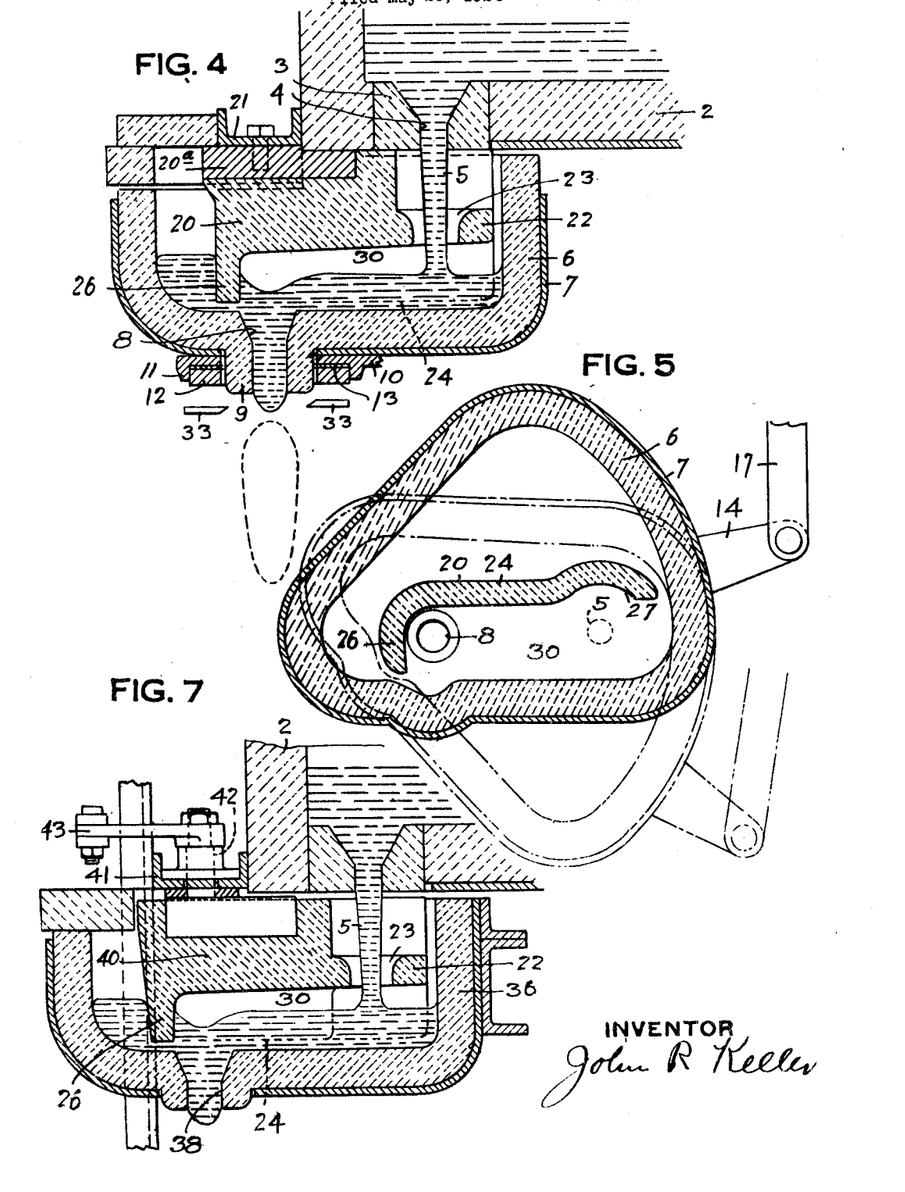
Fig. 4 is a vertical sectional view similar to Fig. 1, showing the appearance of the glass during the retracting and accumulating stage.
Fig. 5 is a horizontal sectional view of the structure shown in the preceding figures, the section being taken substantially on the line 5—5 of Fig. 1.
Fig. 7 is a vertical sectional view showing a modified construction in which the impeller is swung horizontally, and the receptacle is held stationary.
Figure 8:
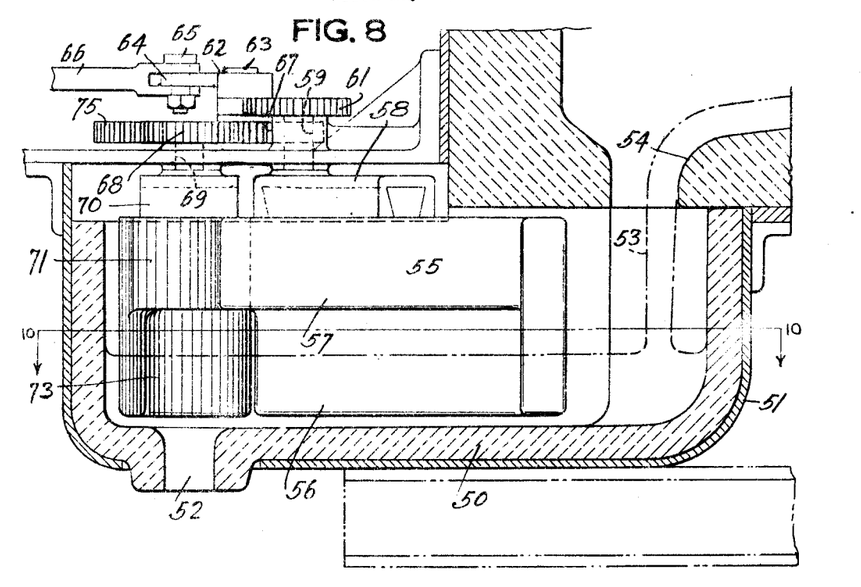
Fig. 8 is a vertical sectional view, with the impeller and its operating mechanism shown in elevation, of a further modification in which the impeller is swung horizontally and the receptacle is held stationary, the section being taken substantially on the line 8—8 of Fig. 9.

In the operation of the device shown in Figs. 1 to 6, the glass flows in a continuous stream 5 through the opening 23 of the impeller 20 and into the receptacle 6, where it accumulates in the intervals between the expulsion of mold charges from the receptacle. Fig. 4 shows the glass in the process of being thus accumulated, and this figure also shows the result produced by swinging the receptacle 6 horizontally. This movement of the receptacle enlarges the pocket 30 between the impeller 20 and the adjacent wall of the receptacle 6, and a reduction in pressure occurs in the space 30 which checks the downward flow of glass through the outlet 8 and may even retract the glass upwardly into this outlet. As the glass continues to flow into the receptacle, it fills the space 30, either partially or completely, and also flows around the ends of the impeller 20 into that portion of the receptacle 6 which lies beyond the impeller 20.

At a time which is properly selected with reference to the accumulation of the glass in the receptacle 6 and with reference to the presentation of a new mold beneath the outlet 8. the receptacle 6 is swung in the opposite direction, or upwardly, as shown in Fig. 2. This contracts the pocket 30 and applies a pressure to the glass which is confined in the pocket 30. There are several outlets through which the glass may escape from the pocket 30, but the path of least resistance is through the discharge outlet 8, and consequently the glass issues from this outlet in a depending mass. During the accumulation of glass in the receptacle 6 before the receptacle begins to swing, there is a preliminary discharge of glass by gravity through the opening 8, and the glass issuing under the impulse produced by swinging the cup is added to that portion which has first issued by gravity. If the movement of the receptacle is so timed as to take place before any substantial quantity of glass has issued by mere gravity flow, and if the receptacle is given a short and quick movement, the resulting mass or gather of glass below the outlet 8 may have the short and chunky appearance shown at 31, Fig. 1. If, however, a longer interval of time is provided during which the glass is allowed to flow by gravity, or if the receptacle is swung more slowly, or if both of these adjustments are made, the resulting accumulation or gather may have the more elongated appearance shown in dotted lines at 32, Fig. 1. After each suspended gather of glass is produced, a mold charge is cut off by means of shears which are indicated diagrammatically at 33, and the mold charge is received either directly in a mold or upon a chute or trough which conveys it to a mold. If desired, the glass may be attenuated or necked-in at the severing plane, by causing the retracting movement of the receptacle 6 to take place prior to the severing operation, and such an attenuation is shown at 34, Fig. 1.

Fig. 7 shows a modified construction, which differs from that of Figs. 1 to 6 in that the receptacle 36 is held stationary and the impeller 40 is oscillated horizontally around the axis of the discharge outlet 38 of the receptacle 36 and toward and away from the descending stream of glass 5. The impeller 40, as shown, is suspended from a channel member 41 that is in turn suspended from a pivot pin 42 extending through the channel 21 and connected to a lever 43 by means of which the impeller 40 may be swept back and forth to produce alternate increase and decrease in pressure on the glass in the pocket 30 in the same manner as has been described in connection with the device of Figs. 1 to 6. The opening 23 of the impeller 40 in this form is, of course, given dimensions such as to permit the continuous flow of the stream 5 into the chamber 30. In other respects the impeller is constructed substantially in the same manner as the impeller 20 of Figs. 1 to 6, and its corresponding parts are similarly numbered.

Figs. 8 to 12 show a further modification, which resembles the structure of Fig. 7 in that the receptacle is held stationary and the impeller is oscillated. The structure of Figs. 9 to 12 includes as an additional feature an auxiliary end wall for the impeller which cooperates with the impeller to form a pocket for confining the glass when the impeller sweeps in one direction and then swings to cooperate with the impeller in a similar manner when the impeller sweeps in the opposite direction.

As shown in Figs. 8 to 12, the receptacle 50 is held in a stationary metal casing 51 supported beneath the outlet of a glass container, and is provided with a downwardly opening discharge outlet 52. In this instance, the glass is delivered in a column 53 which flows over a lip 54, but the glass may be delivered through an outlet such as the outlet 4 shown in Fig. 1.

Figure 12:
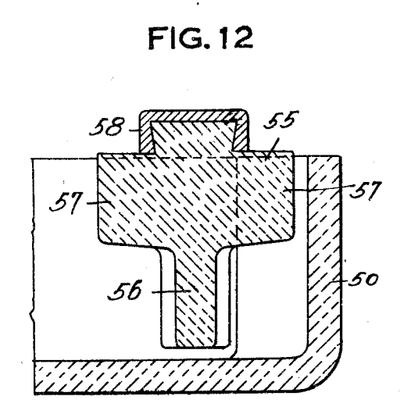
Fig. 12 is a vertical sectional view taken substantially on the line 12—12 of Fig. 9.

In the receptacle 50 is an oscillating impeller or sweep 55, which is T-shaped in cross section, as shown in Fig. 12, and has a vertical wall portion 56 and two overhanging portions 57. The impeller 55 is suspended by means of a channel member 58 which in turn is suspended from a pivot pin 59 extending through an opening in a stationary cover-plate 60. A spur gear 61 is secured to the upper end of the pivot pin 59 and meshes with a segmental gear 62 carried by a stub shaft 63 to which is secured a lever 64 that is connected by a pin-and-slot connection 65 to an operating lever 66. The lever 66 is reciprocated lengthwise by means of suitable operating connections, not shown.

Figure 11:
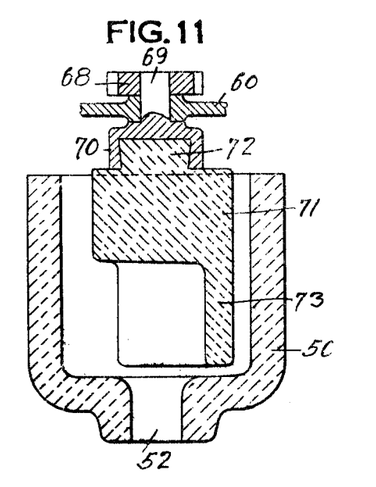
Fig. 11 is a vertical sectional view taken substantially on the line 11—11 of Fig. 9.

The stub shaft 63 carries, in addition to the segmental gear 62, a gear wheel 67 which is free to rotate on pin 63 and which meshes with a smaller spur gear 68 carried by a vertical stub shaft 69, which extends through the cover plate 60 and carries at its lower end a socket member 70 for suspending an oscillating auxiliary wall member 71. The member 71 has on its upper surface a slightly flaring projection 72 received in the socket member 70, and is also provided with a depending curved wall portion 73. As best shown in Fig. 11, the body of the member 71 overhangs the wall member 73 directly above the discharge outlet 8 of the receptacle 50.

For the purpose of oscillating the auxiliary wall member 71 around the axis of its supporting shaft 69, I provide a pinion 75 which meshes with the gear wheel 67 and is carried by a vertical shaft 76 driven by suitable power connections, not shown.

The oscillation of the auxiliary wall member 71 is timed to take place after the completion of each discharge of glass and during the next succeeding oscillation of the impeller 55. The auxiliary wall member preferably moves somewhat more quickly than the impeller 55 and is thus brought into proper position to cooperate with the impeller 55 as the impeller delivers the next impulse to the glass. The auxiliary member 71 thus receives the initial impulse applied to the glass by the impeller 55 and forms a wall which prevents the escape of the glass from the pocket between the impeller and the wall of the receptacle during the application of the extrusive pressure.

Figure 10:
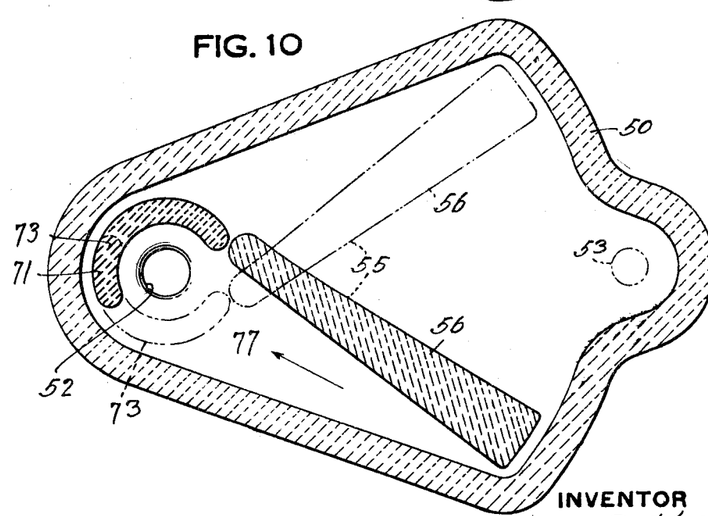
Fig. 10 is a horizontal sectional view taken substantially on the line 10—10 of Fig. 8.

When the impeller 55 and the wall member 71 are in the full-line position shown in Fig. 10, they cooperate to form a pocket communicating with the discharge opening 8, and when they are swung to the opposite position shown in dotted lines in Fig. 10, they cooperate in a similar manner to form a pocket on the opposite side of the receptacle 50. This form of my device thus operates to feed a charge of glass through the discharge outlet of the receptacle each time that the impeller 50 sweeps from side to side, instead of once during each alternate movement of the impeller or the receptacle, as in the device of Figs. 1 to 7.

Figure 9:
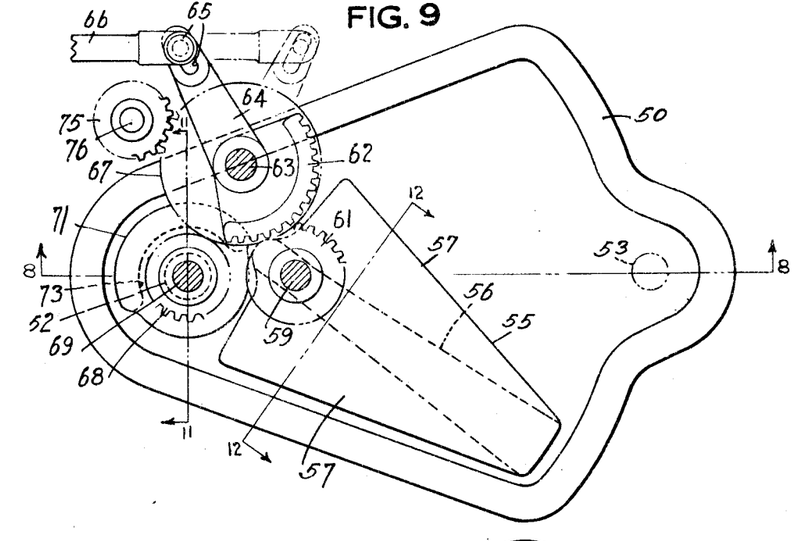
Fig. 9 is a plan view of the receptacle and the impeller mechanism shown in Fig. 8.

It will be seen on Figs. 9 and 10 that the vertical wall portion 56 of the impeller 55 tapers from its outer end to its inner end while the overhanging flange portions 57 of the impeller taper in the opposite direction.

It will also be observed that the pocket 77 which, as shown in Fig. 10, is formed between the impeller 55 and the wall of the receptacle, tapers outwardly from the discharge outlet 52. By reason of this tapering shape of the pocket, the outer end of the pocket begins to close immediately when the impeller passes the longitudinal center of the receptacle. This prevents any tendency of the glass to build up adjacent to the free or movable end of the impeller, and causes the glass entrapped in the pocket 77 to tend to move toward the outlet 52.

In the operation of the apparatus shown in Figs. 8 to 12, the glass flows in a continuous stream into the receptacle at the end of the receptacle opposite to the discharge outlet 8. When the impeller gearing is set in motion, the impeller 55 sweeps from side to side in the receptacle, thereby agitating the glass in the receptacle and thus assisting in causing the glass to be uniform in temperature and consistency when it is discharged through the opening 8. As the impeller approaches the wall of the receptacle 50 in either direction, it confines a portion of the glass in the pocket formed by the overhanging portion 57 and the wall portion 56 of the impeller, and applies a progressively increasing pressure to the confined glass, which operates to force the glass through the discharge opening 8 at a rate proportional to the speed of movement of the impeller.

Each swinging movement of the impeller is accompanied by a partial revolution of the auxiliary wall member 71, this auxiliary member being thus brought into position to cooperate with the impeller 55 when the impeller sweeps in either direction, so as to assist in confining the glass and forcing it to issue through the opening 8.

Figure 13:
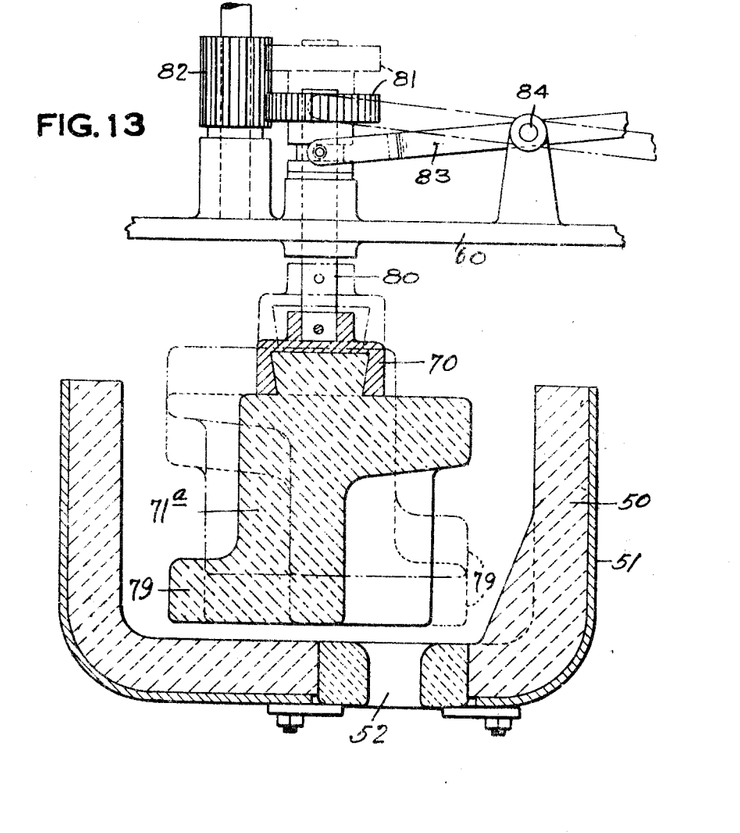
Fig. 13 is a vertical sectional view showing a still further modification in which a portion of the impeller mechanism is raised and lowered for the purpose of assisting in raising the stub of glass which remains above the shears after each severing operation.

In Fig. 13 of the drawing I have shown a modified device which is similar to the construction shown in Figs. 9 to 12, with the difference that the auxiliary end wall is so arranged as to be lifted after it completes each oscillation, and this lifting movement is utilized to assist the retraction of the glass at the outlet of the receptacle. As in Figs. 8 to 12, this device includes a receptacle 50, a casing 51, a discharge outlet 52, a horizontally swinging impeller, not shown, and an auxiliary wall member 71ª. The lower end of the auxiliary member 71ª is formed with a lateral extension 79 which, when the member 71ª is swung upon the axis of the shaft 80, covers the discharge outlet 52. The support 70 from which the auxiliary member 71ᵃ is suspended is carried by a vertical shaft 80 which carries at its upper end a gear wheel 81 meshing with an elongated driving pinion 82 which is driven from any suitable source of power. A lever 83 pivoted at 84 is connected to raise and lower the shaft 80, and the movements of the lever 83 are so timed that when the member 71ᵃ is swung upon the axis of the shaft 80, to cover the outlet 52, the member 71ᵃ is lifted, thus producing a suction at the outlet 52 which assists the retractive action of the main impeller in arresting the discharge of glass through the outlet 52, or producing an upward movement of the glass at the outlet if such upward movement is desired. The member 71ᵃ is then lowered and at the same time is rotated in the reverse direction to bring it to the position shown in Fig. 13, where the outlet 52 is again uncovered. During this rising and falling movement of the member 71, the main impeller swings away from the side of the receptacle, and when the auxiliary member 71 has returned to the position shown in Fig. 13, the impeller again sweeps in the glass-discharging direction, thus accumulating and discharging the glass in the manner described above in connection with Fig. 7 and Figs. 8 to 12.

It will be noted that the apparatus of Fig. 13 produces a discharge of glass once for each alternate movement of the impeller, the outlet being covered by the auxiliary member 71 during the reverse movements of the impeller. This form of my device may be further modified by holding the main impeller stationary, and swinging the receptacle 50, as in the device of Figs. 1 to 6.

I have shown and described some of the constructions which are well adapted for carrying out my invention, but it will be understood that various changes may be made in the construction and arrangement of parts without departing from my invention, and I therefore desire that no limitations be imposed upon my invention except such as are indicated in the appended claims.

I claim as my invention:—

1. The method of feeding molten glass, that comprises placing the glass in a receptacle having a downwardly opening discharge outlet, and also having a stationary impelling member in contact with the glass in said receptacle and oscillating said receptacle around the axis of said discharge outlet, thereby causing the glass to issue periodically from said outlet.

2. The method of feeding molten glass, that comprises causing the glass to flow in a continuous stream into a receptacle having a discharge outlet, said receptacle also containng a stationary impelling member, and oscillating said receptacle around the axis of said discharge outlet, thereby forcing glass periodically through said discharge outlet.

3. Glass feeding apparatus comprising a receptacle having a downwardly opening discharge outlet, an impelling member extending into said receptacle, and means for moving one of said members about a vertical pivot.

4. Glass feeding apparatus comprising a receptacle movable about a vertical axis and having a downardly opening discharge outlet, means for introducing a stream of molten glass into said receptacle at a point laterally displaced from said outlet, an impelling member extending into said receptacle, and means for producing relative horizontal pivotal movement between said receptacle and said impelling member.

5. Glass feeding apparatus comprising a receptacle having a downwardly opening discharge outlet, an impelling member extending into said receptacle, and means for swinging one of said members horizontally with respect to the other and around the axis of said discharge outlet.

6. Glass feeding apparatus comprising a receptacle having a downwardly opening discharge outlet, an impelling member extending into said receptacle, and means for oscillating said receptacle around the axis of said discharge outlet.

7. Glass feeding apparatus comprising a receptacle of generally triangular form having a downwardly opening discharge outlet near one of its angles, an impelling member extending into said receptacle, and means for producing relative oscillating movement between said impelling member and said receptacle around the axis of said discharge outlet.

8. Glass feeding apparatus comprising a receptacle of generally triangular form having a downwardly opening discharge outlet near one of its angles, an impelling member extending into said receptacle, means for producing relative oscillating movement between said impelling member and said receptacle around the axis of said discharge outlet, and means for introducing a stream of molten glass into said receptacle at a point laterally displaced from said discharge outlet.

9. Glass feeding apparatus comprising a receptacle, an impelling member extending into said receptacle, and means for producing relative oscillation between said receptacle and said impelling member, the said impelling member being provided with a vertical wall portion and with an overhanging portion forming a pocket for confining a portion of the glass when said impelling member approaches a wall of said receptacle.

10. Glass feeding apparatus comprising a receptacle, an impelling member extending into said receptacle, means for producing relative oscillation between said receptacle and said impelling member, the said impelling member being provided with a vertical wall portion and with an overhanging portion forming a pocket for confining a portion of the glass when said impelling member approaches a wall of said receptacle, and a recess formed in a wall of said receptacle and adapted to cooperate with said impeller in confining the glass.

11. Glass feeding apparatus comprising a receptacle having a downwardly opening discharge outlet, an impelling member disposed in said receptacle, means for producing relative horizontal swinging movement between said receptacle and said impelling member around the axis of said discharge outlet, and means for introducing a stream of molten glass into said receptacle at a point displaced from said discharge outlet, the said impelling member being provided with an opening to admit said stream and having glass-controlling vertical surfaces that partially surround said discharge outlet and the entering stream of glass.

Signed at Pittsburgh, Pa., this 2nd day of May, 1924.

JOHN R. KELLER